(12) United States Patent
Yokota et al.

(10) Patent No.: US 6,547,480 B1
(45) Date of Patent: Apr. 15, 2003

(54) COMPOSITE STRUCTURE

(75) Inventors: Hiroshi Yokota, Hiroshima (JP); Mario Miura, Hiroshima (JP)

(73) Assignee: Kabushiki Kaisha Yokota Seisakusho, Hiroshima-Ken (JP)

( * ) Notice: Subject to any disclaimer, the term of this patent is extended or adjusted under 35 U.S.C. 154(b) by 0 days.

(21) Appl. No.: 09/743,625

(22) PCT Filed: Jul. 14, 1999

(86) PCT No.: PCT/JP99/03815

§ 371 (c)(1),
(2), (4) Date: Jan. 12, 2001

(87) PCT Pub. No.: WO00/04294

PCT Pub. Date: Jan. 27, 2000

(30) Foreign Application Priority Data

Jul. 14, 1998 (JP) .............................. 10-199358

(51) Int. Cl.⁷ ................................. F16B 7/00
(52) U.S. Cl. ......................... 403/368; 428/99
(58) Field of Search .............. 428/57, 99; 403/368, 403/367, 365; 285/339, 349; 416/204 R, 207, 213, 244 R

(56) References Cited

U.S. PATENT DOCUMENTS 993,661 A * 5/1911 Dudley ...................... 403/268
3,477,335 A * 11/1969 Gold et al. ................. 403/268

FOREIGN PATENT DOCUMENTS

| EP | 0 334 020 | 9/1989 |
| JP | 50-128052 | 10/1975 |
| JP | 60-15903 | 2/1985 |
| JP | 1-283415 | 11/1989 |

* cited by examiner

Primary Examiner—Alexander S. Thomas
(74) Attorney, Agent, or Firm—Ladas & Parry

(57) ABSTRACT

An object of the present invention is to obtain economically a corrosion-resistant, abrasion-resistant or heat-resistant composite structure having a high strength by joining together two members so that the two members may not separate from each other. A composite structure is formed by combining and joining together first and second members. The first member has a protruding part expanding toward its extremity and the second member has a concave part defining a space of a shape corresponding to that of the protruding part of the first member and capable of forming a predetermined clearance between the protruding part of the first member and a surface of the concave part of the second member when the first and the second member are combined. Separation of the first and the second member from each other is prevented by inserting wedges in the clearance. Vacant portions of the clearance remaining after the wedges have been inserted in the clearance may be filled up with a filler.

2 Claims, 5 Drawing Sheets

COMPOSITE STRUCTURE

TECHNICAL FIELD

The present invention relates to a composite structure of different materials, such as metals, ceramic materials, plastic materials and/or carbon or a composite structure of the same material.

BACKGROUND ART

It is generally known to join together members of different materials to form a composite structure having high chemical and mechanical properties, such as corrosion resistance, abrasion resistance, heat resistance and the like. Generally, a joining method that employs a mechanical joining process, such as thermal shrinkage fit or fit, or a bonding process using an adhesive is used to join together members of different materials, such as a metal member, and a ceramic or sintered member that is brittle but has high corrosion resistance and abrasion resistance.

The mechanical joining process for forming a composite structure by joining together mating members requires precision machining for shaping the mating members to avoid breakage of the mating members by stress concentration due to local contact forming between the mating members or difference in thermal expansion coefficient between the mating members. Therefore, the costs of forming the composite structure are high or working temperature range for the composite structure is limited.

Although the bonding process using an adhesive places some restrictions on working temperature range for the composite structure, the bonding process is easy to carry out and the costs of forming the composite structure by the bonding process are low. Therefore, the bonding process using an adhesive has become prevalent in recent years with the progress of adhesives. However, although the adhesive is capable of withstanding a high stationary load, the adhesive is frail under an impulsive load. In some cases, the composite structure is subject to fatal damage when an adhesive layer bonding the mating members together is broken by an impulsive load. Particularly, since the toughness of a ceramic member is low, when two mating members are separated due to the failure of the adhesive bonding the two mating member together, there is a possibility that the ceramic member breaks and, if the ceramic member is a rotating member, fragments of the broken ceramic member are scattered around.

It is an object of the present invention to overcome the disadvantages of the joining method of joining together members of different materials or the same material drastically and to obtain economically a strong composite structure excellent in corrosion resistance, abrasion resistance, heat resistance and the like.

DISCLOSURE OF THE INVENTION

To achieve the object, the present invention provides a composite structure comprising: first and second members combined and joined together, wherein the first member has a protruding part expanding toward its extremity, the second member has a concave part defining a space of a shape corresponding to that of the protruding part of the first member and capable of forming a predetermined clearance between the protruding part of the first member and the concave part of the second member when the first and the second members are combined, a minimum inside diameter of the concave part is greater than a maximum outside diameter of the protruding part and a wedge is inserted into the clearance between the protruding part of the first member and the concave part of the second member so that the first and the second members are prevented from being separated from each other.

In this composite structure, the clearance into which the wedges have been inserted, may be filled up with a filler.

In this composite structure, one of the first and the second member may be formed of a nonmetallic material and the other may be formed of a metal.

In this composite structure, at least either the first or the second member may be a corrosion-resistant, heat-resistant or abrasion-resistant member.

In this composite structure, one of the first and the second member may be a corrosion-resistant, heat-resistant or abrasion-resistant vane structure, and the other may be a vane holding member of a metal, and the first and the second member may be assembled by fitting one into the other to form a runner or an impeller.

In this composite structure, one of the first and the second member may be a decorative member and the other may be a holding member of a metal or a nonmetallic material.

BEST MODE FOR CARRYING OUT THE INVENTION

Figure 1:
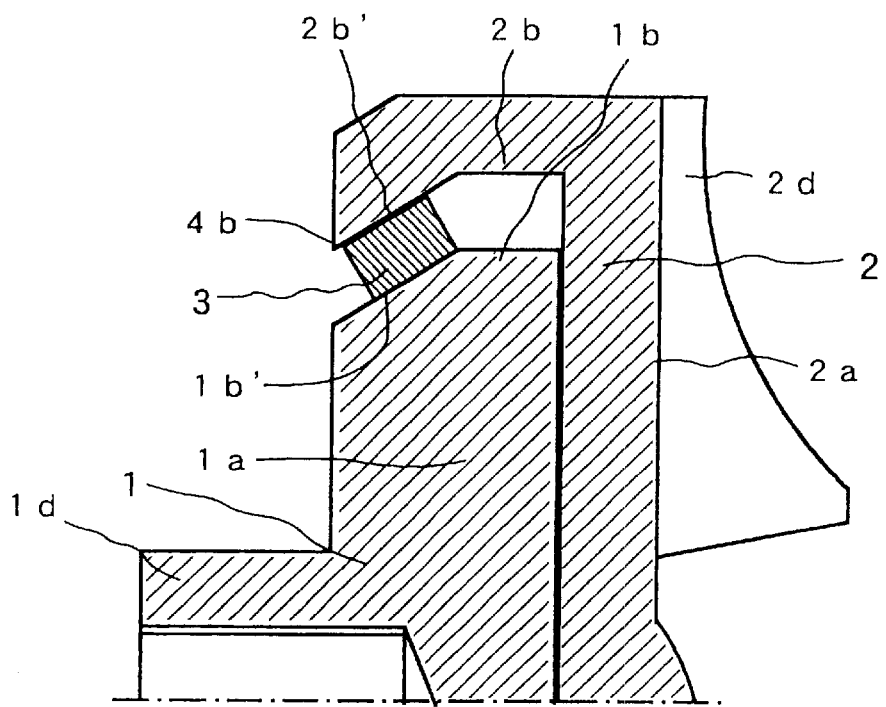
FIG. 1 is a half longitudinal sectional view of a composite structure in a first embodiment according to the present invention.

The present invention is applicable to all kinds of structures formed by joining together two members of metals, ceramic materials, plastic materials and the like, which may be used in combination. Since those structures are similar in basic technical idea and the gist of the invention, the present invention will be described in terms of an impeller for a pump formed by combining members of a metal and those of a ceramic material with reference to FIG. 1.

An impeller is formed by combining a vane holding member 1 of a metal, i.e., a first member, and a vane structure 2 of a ceramic material, i.e., a second member, and fastening the same together with wedges 3. The ceramic vane structure 2 has a disk 2$a$ and vanes 2$d$ formed integrally with the disk 2$a$. The vane structure 2 has a concave, stepped peripheral wall 2$b$ defining a space for receiving a protruding peripheral part 1$b$ of the vane holding member 1. The peripheral part 1$b$ has an inclined peripheral surface 1$b'$ expanding toward the extremity of the vane holding member 1. The stepped peripheral wall 2$b$ has an inner surface 2$b'$. When the vane holding member 1 and the vane structure 2 are combined, the inner surface 2b' of the vane structure 2 faces the inclined peripheral surface 1b' of the vane holding member 1 with a predetermined clearance 4b formed between the inner surface 2b' and the inclined peripheral surface 1b'. Wedges 3 are inserted in the clearance 4b.

The minimum inside diameter of the stepped peripheral wall 2b is slightly greater than the maximum diameter of the peripheral part 1b. Therefore, the peripheral part 1b can be freely fitted in a space defined by the stepped peripheral wall 2b. When the wedges 3 are inserted in the clearance 4b between the inner surface 2b' and the inclined peripheral surface 1b', the vane holding member 1 and the vane structure 2 cannot be separated from each other unless the wedges 3 are broken. Thus, the vane holding member 1 and the vane structure 2 can be surely prevented from separation from each other in axial directions.

When the wedges 3 are made of a properly elastic material, the ceramic vane structure 2 can be held on the vane holding member 1 as if the same is fastened through cushioning members having a predetermined area to the vane holding member 1. Since the vane structure 2 is not fastened to the vane holding member 1 with screws or the like, local stress concentration on the vane structure 2 due to local contact between the vane holding member 1 and the vane structure 2 can be prevented. The relative position and the concentricity of the vane holding member 1 and the vane structure 2 can be adjusted by properly determining the thickness of each of the wedges 3.

Although not shown in FIG. 1, mating projections and recesses may be formed in a disk 1a of the vane holding member 1 and the disk 2a of the vane structure 2, respectively, or in the peripheral part 1b of the vane holding member 1 and the stepped peripheral wall 2b to prevent the vane holding member 1 and the vane structure 2 from turning relative to each other so that reliable torque transmission can be realized. A boss 1d of the vane holding member 1 may be fastened to a shaft by a suitable method, such as a method using screws or a method using nuts.

In this embodiment, the stepped peripheral wall 2b of the vane structure 2 holds the peripheral part of the vane holding member 1 therein. A peripheral part of the vane structure 2 may be held in the vane holding member 1. When the peripheral part of the vane structure 2 is held in the vane holding member 1, the area of a liquid contact surface of the vane holding member 1 of a metal increases and the ceramic vane structure 2 can be restrained from fracturing and scattering even if the ceramic vane structure 2 is cracked.

Although this embodiment has been described in connection with a main vane, of course, an outvane may be of the same structure and the same structure may be applied to the front plate and the back plate of a pump casing.

Figure 2:
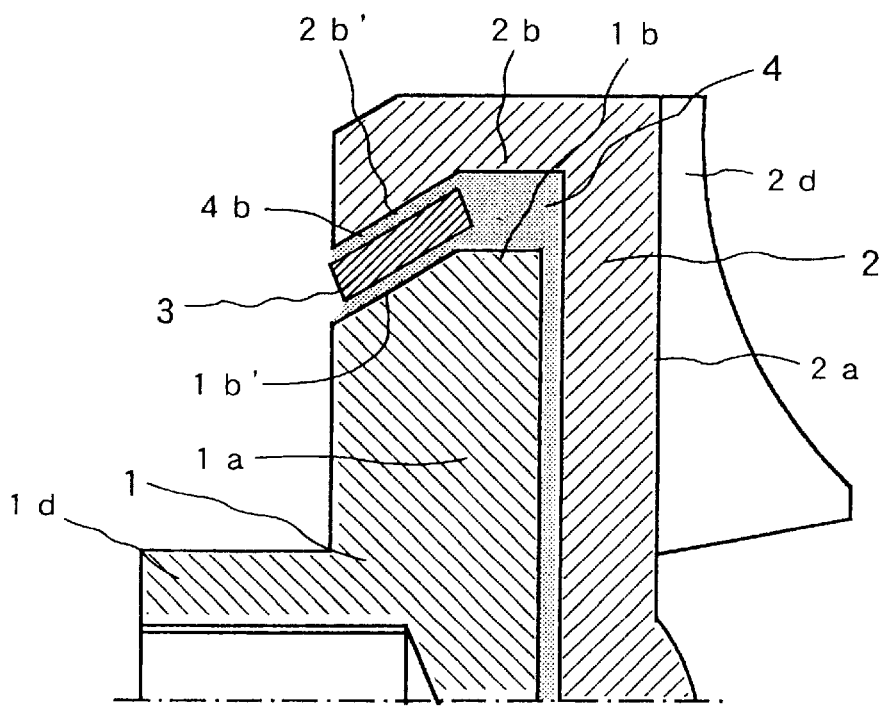
FIG. 2 is a half longitudinal sectional view of a composite structure in a second embodiment according to the present invention.

In the embodiment shown in FIG. 1, the vane holding member 1 and the vane structure 2 are mechanically fastened together by properly and selectively determining the shape of the clearance 4b and the material and dimensions of the wedges 3. The clearance 4b between the vane holding member 1 and the ceramic vane structure 2 or gaps between the vane holding member 1 and the wedges 3 and between the vane structure 2 and the wedges 3 may be filled up with a filler 4 as shown in FIG. 2. The filler 4 filled in the gaps form elastic films, each having predetermined thicknesses. The elastic films securely joins the vane holding member 1 and the vane structure 2, prevent direct contact between the vane holding member 1 and the vane structure 2, and absorb movement of the vane holding member 1 and the vane structure 2 relative to each other due to difference in thermal expansion coefficient between the vane holding member 1 and the vane structure 2.

The filler 4 may be adhesive. Use of an adhesive filler is advantageous inmost cases. A cured adhesive filler is capable of preventing the wedges 3 from falling off with reliability, and of fastening together the vane holding member 1, the vane structure 2 and the wedges 3 to complement the separation preventing effect of the wedges 3. It is still more preferable that the cured filler 4 has a predetermined elasticity.

The films of the filler 4 must be formed in a proper thickness to stabilize adhesive strength. The size of the gap between the vane holding member 1 and the vane structure 2 can be held constant by properly determining the thickness of the wedges 3. Thus, the films of the filler 4 can be formed in a fixed thickness to secure stable adhesive strength.

In FIGS. 1 and 2, the clearance 4b has a parallelogrammatic cross section, and the wedges 3 are rectangular thin plates. However, the clearance 4b between the first member 1 and the second member 2 may have a cross section of a semicircular shape, a polygonal shape or a combination of those shapes as shown in FIG. 3 showing impellers and various combinations of members in preferred embodiments, and wedges 3 of shapes conforming to those embodiments may be used.

FIGS. 3a-1, 3a-2 and 3a-3 show embodiments respectively having clearances 4b of parallelo grammatic cross sections and respectively employing plate-shaped and cylindrical wedges 3. FIGS. 3b-1, 3b-2 and 3b-3 show embodiments respectively having clearances 4b of semicircular cross sections and respectively employing wedges 3 of shapes conforming to the shapes of the clearances 4b. FIGS. 3c-1 and 3c-2 show embodiments respectively having clearances 4b of cranked cross sections and respectively employing plate-shaped wedges 3 and flexible wedges 3. In each of those embodiments, one of the members 1 and 2 holds the other member therein to prevent the axial separation of the members 1 and 2 from each other. In embodiments shown in FIGS. 3d-1, 3d-2 and 3d-3, first members 1 are placed inside second members 2, respectively, and the axial separation in both directions of the first members 1 from the corresponding second members 2 is prevented by wedges 3 interposed between the outer circumferences of the first members 1 and the inner circumferences of the corresponding second members 2.

Figure 3:
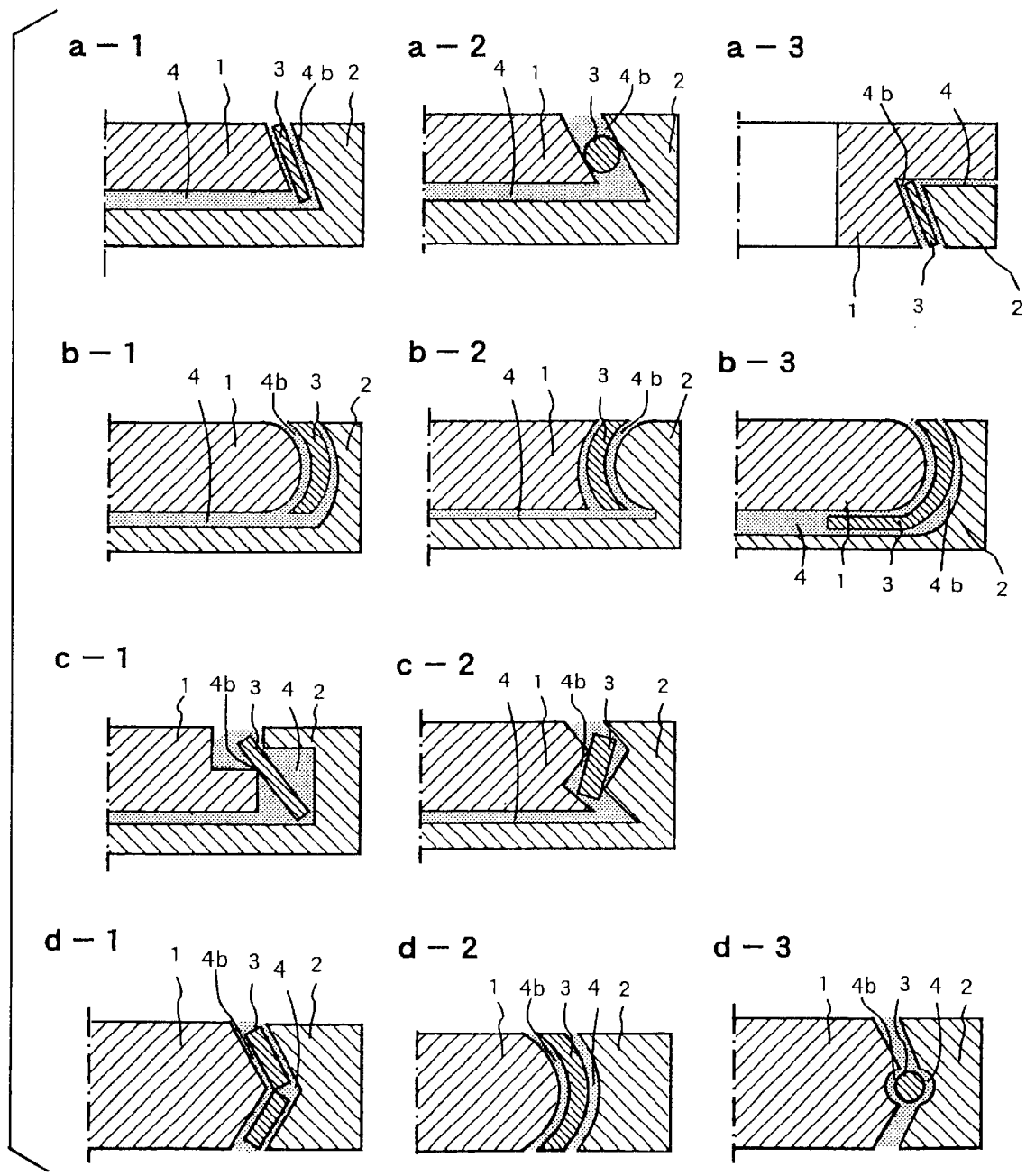
FIG. 3 shows half longitudinal sectional views of portions in which a wedge is inserted of composite structures in preferred embodiments according to the present invention.

FIG. 3a-3 shows a composite structure having a first member 1 and a second member 2 respectively in modifications of a first member 1 and a second member 2 of a composite structure shown in FIG. 3a-1. Similarly, the component members of composite structures other than that shown in FIG. 3a-1 can be modified. A composite structure shown in FIG. 3b-3 employs wedges 3 similar to wedges 3 employed in a composite structure shown in FIG. 3b-1 and extending further into a gap behind a first member 1. The wedges 3 extending into the gap behind the first member 1 as shown in FIG. 3b-3 maintain the size of the gap constant and are capable of perfectly spacing the members I and 2 from each other.

Figure 4:
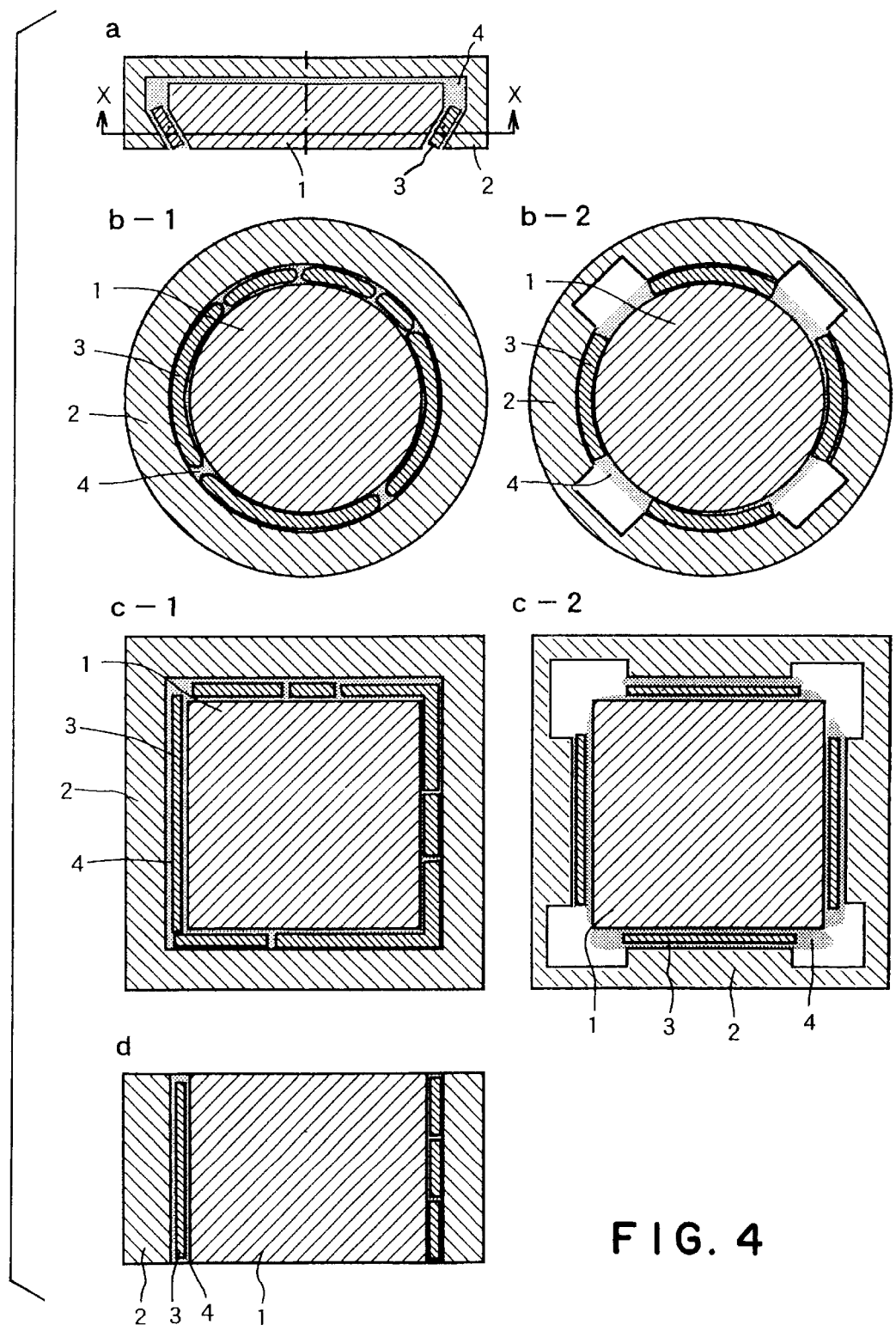
FIG. 4 shows longitudinal sectional views and cross-sectional views of joints of composite structures according to the present invention.

FIG. 4 shows possible shapes of joints. FIG. 4a is a longitudinal sectional view, FIGS. 4b-1, 4b-2, 4c-1, 4c-2 and 4d are sectional views taken on line X—X in FIG. 4a. The joint may be circular as shown in FIGS. 4b-i and 4b-2 or may be square as shown in FIGS. 4c-1 and 4c-2. One of the mating members having a concave part does not need to entirely surround a protruding part of the other member. A member having a concave part may be formed so as to form predetermined clearances in separate regions as shown in FIGS. 4b-2, 4c-2 or 4d. Although circular and square composite structures are shown in FIG. 4, a composite structure may be formed in any shape, provided that a first member 1 and a second member 2 thereof can be combined with a predetermined clearance formed between the first member 1 and the second member 2.

Figure 5:
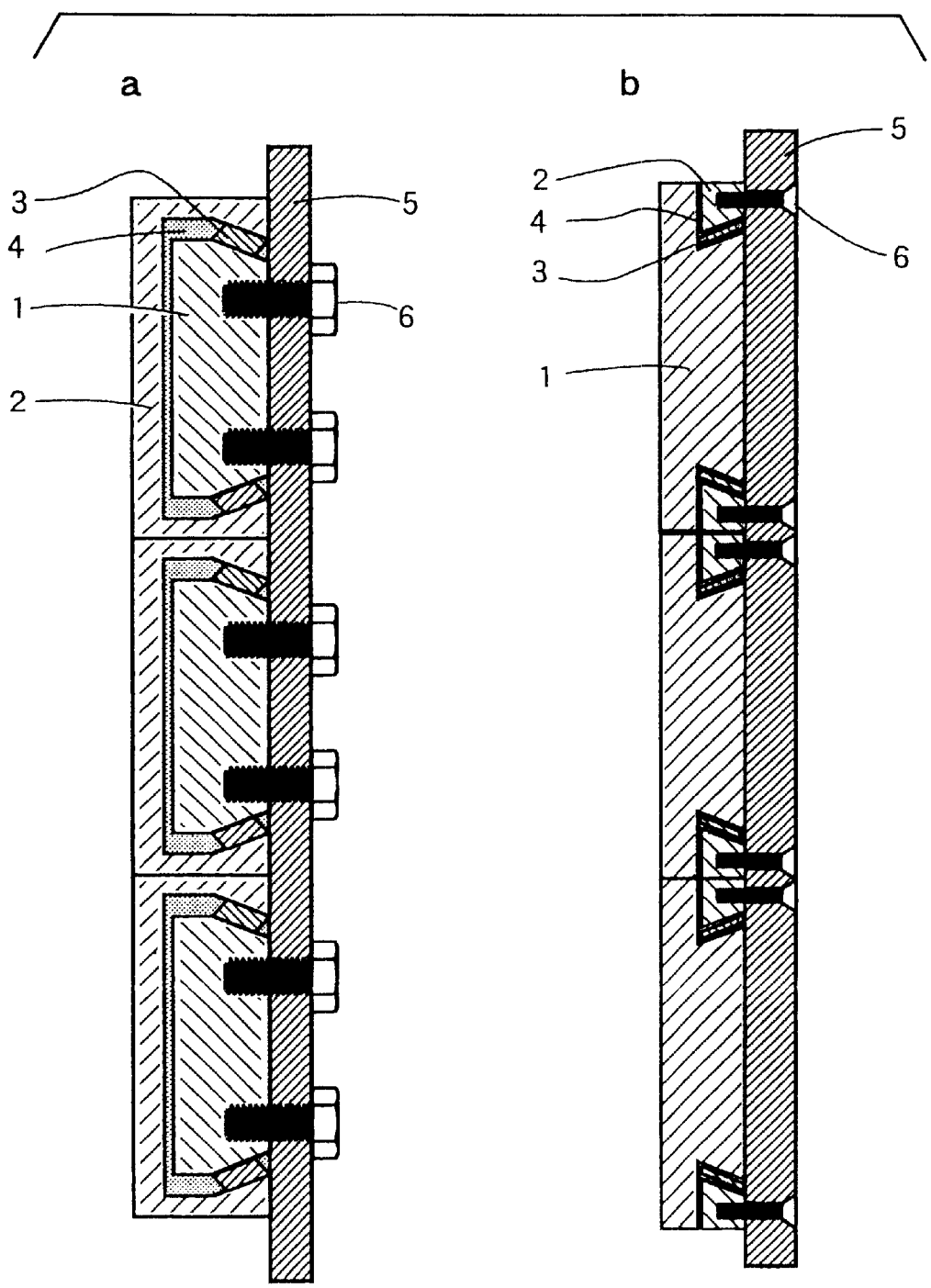
FIG. 5 shows sectional views of composite structures in further embodiments according to the present invention.

FIG. 5 shows corrosion-resistant, abrasion-resistant or heat-resistant structures formed by joining ceramic members, such as tiles, each having a stepped joining space in its back surface to holding members. FIG. 5a shows composite structures each having a ceramic member 2, such as a tile, provided in a central portion of its back surface with a joining space. FIG. 5b shows composite structures each having a ceramic member 1, such as a tile, provided in a peripheral portion of its back surface with joining recesses. A method of joining together the ceramic members and the holding members is the same as those described above and hence the description thereof will be omitted. corrosion-resistant, abrasion-resistant or heat-resistant board of a large area for covering a large area can be constructed by attaching a necessary number of the corrosion-resistant, abrasion-resistant or heat-resistant structures to a support plate 5 with screws 6 or the like. Although the foregoing embodiments employs the members of a ceramic material, of course, the members may be formed of any suitable one of materials capable of serving as means for enhancing corrosion resistance, abrasion resistance, heat resistance, chemical properties or mechanical properties, such as sintered alloys, synthetic resins, carbonaceous materials, glass, wood and such. Naturally, the present invention is applicable to decorative siding structures using members of stone, a porcelain material or a ceramic materials for decorating the surface of buildings.

Figure 6:
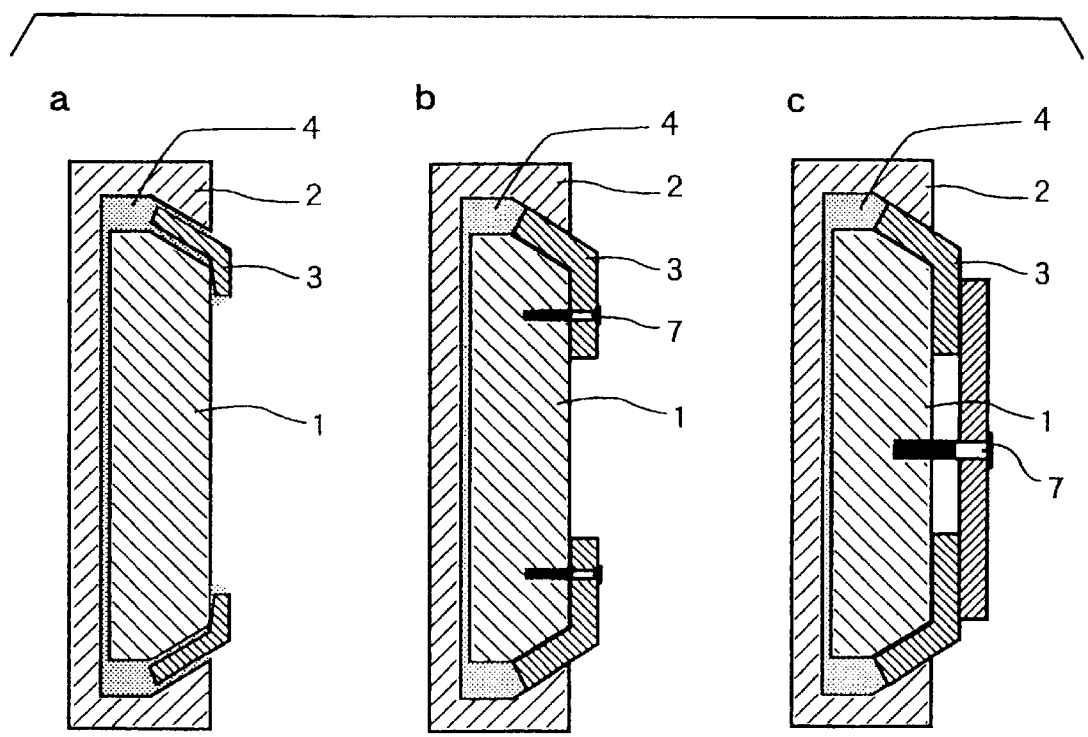
FIG. 6 shows sectional views of assistance in explaining methods of fixing wedges.

In the embodiments shown in FIGS. 1 to 5, the wedges 3 are inserted simply in the clearances. An end part of the wedge 3 may be bent as shown in FIG. 6a or may be bent and the bent end portion may be fixed to the member 1 or 2 by bonding or welding after inserting the same in the clearance to ensure the fixation of the wedge 3. The bent end portion may be fastened to the member 1 or 2 with a screw 7 as shown in FIG. 6b, or may be held in place by a cover fastened to the member 1 or 2 with a screw 7 as shown in FIG. 6c.

In all the foregoing embodiments, the wedges 3 may be formed of a rigid metal, a flexile synthetic resin, rubber or the like and the material forming the wedges 3 are determined selectively according to purposes. The wedges 3 may be of any suitable shape, such as flat plates, elongate strips or cylindrical members. The wedges 3 may be rectangular plates arranged at proper intervals in the clearance as shown in FIG. 4. A strip that extends in the entire clearance may be used as the wedge 3. As mentioned above, vacant spaces remaining after the wedges have been inserted in the clearance may be filled up with the filler 4.

The present invention is not limited in its practical application to the foregoing embodiments specifically described herein and many changes and variations may be made therein without departing from the scope and spirit thereof.

INDUSTRIAL APPLICABILITY

As is apparent from the foregoing description, according to the present invention, members respectively of different materials differing in properties, such as thermal expansion coefficient and mechanical properties can be surely joined together, separation of the members can be surely prevented, and strain in the joining surfaces of the members due to difference in thermal expansion between the members and movement of the members relative to each other can be absorbed to a predetermined extent. A strong composite structure having desired properties including proper corrosion resistance, abrasion resistance and/or heat resistance can be economically manufactured. The present invention exercises significant effects when applied to industry.

What is claimed is:

1. A composite structure comprising:
   first and second members combined and joined together;
   wherein the first member has a protruding part expanding toward its extremity, the second member has a concave part defining a space of a shape corresponding to that of the protruding part of the first member and capable of forming a predetermined clearance between the protruding part of the first member and the concave part of the second member when the first and the second members are combined, a minimum inside diameter of the concave part is greater than a maximum outside diameter of the protruding part and a wedge is inserted into the clearance between the protruding part of the first member and the concave part of the second member so that the first and the second members are prevented from being separated from each other,
   wherein
   one of the first and the second member is a corrosion-resistant, heat-resistant or abrasion-resistant vane structure, and the other is a vane holding member of a metal, and the first and the second member are assembled by fitting one into the other to form an impeller.

2. The composite structure according to claim 1, wherein the clearance into which the wedges have been inserted is filled up with a filler.

* * * * *